Dec. 12, 1950     R. J. MAUS     2,533,949
MOUNTING FOR DIAL TEST INDICATORS
Filed May 7, 1947
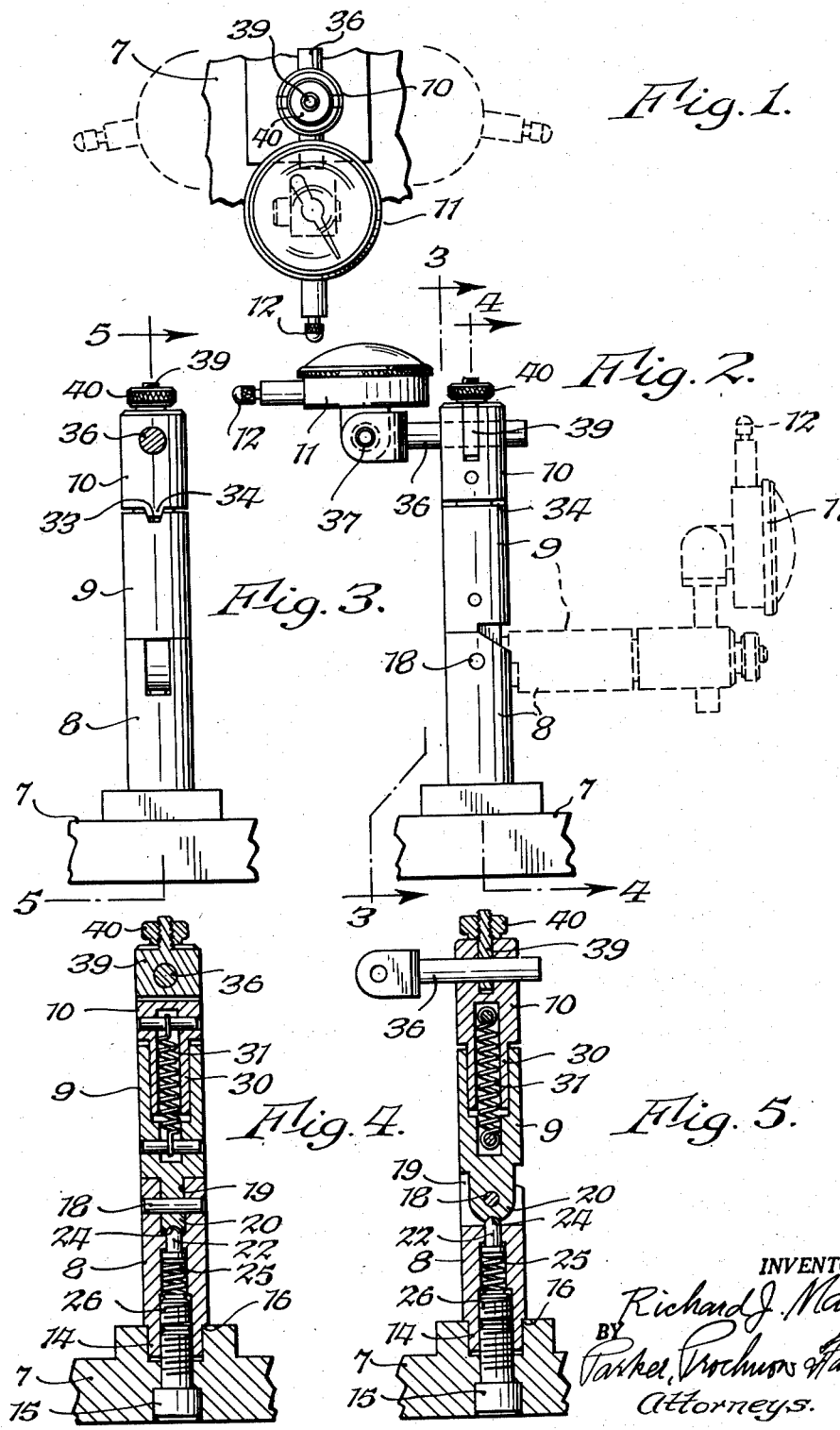
INVENTOR.
Richard J. Maus
BY Parker, Trochun & Farmer,
Attorneys.

Patented Dec. 12, 1950

2,533,949

UNITED STATES PATENT OFFICE 2,533,949

MOUNTING FOR DIAL TEST INDICATORS

Richard J. Maus, Buffalo, N. Y.

Application May 7, 1947, Serial No. 746,575

4 Claims. (Cl. 248—121)

This invention relates to improvements in means for mounting dial test indicators or gages in operative relation to the work to be tested or gaged.

Heretofore dial test indicators have been mounted in such a manner that the feelers of the indicators can be set with a high degree of accuracy into any desired position on a machine tool, test plate or other support. When different work pieces to be tested can be placed successively into operative relation to this test indicator without requiring movement of the test indicator, then the test indicator can be used repeatedly without requiring any adjustment thereof. However, in some instances, the work pieces are of such nature that if a work piece is to be removed and replaced by another work piece, the test indicator must be moved out of the way, whereupon the test indicator must be accurately re-adjusted for each work piece to be tested.

One of the objects of this invention is to provide a test indicator mounting which may be secured in operative relation to a machine or other support, and in which the mounting includes parts movable relatively to each other to move the test indicator into an inoperative position while one work piece is being replaced by another, and then again returned accurately to its initial adjusted position for making the necessary test on a succeeding work piece. A further object of this invention is to provide a support of this type including a column comprising a number of members, one of which is secured to a base and another of which has a test indicator secured thereto, the members being pivotally connected and being provided with releasable interlocking parts, by means of which the members can be returned to their original positions when the test indicator is to be used. A further object is to provide a column of this type comprising three members connected with each other by means of pivots having their axes extending in different directions so that the test indicator may be readily swung into a number of different positions, the members being provided adjacent to each pivotal connection with parts for releasably securing the members accurately into their operative positions. Other objects and advantages of this invention will appear from the following description and claims.

In the accompanying drawings:

Fig. 1 is a top plan view of a test indicator mounting embodying this invention.

Fig. 2 is a side elevation thereof.

Fig. 3 is a side elevation thereof, substantially at a right angle to that shown in Fig. 2, partly in section, on line 3—3, Fig. 2.

Fig. 4 is a central sectional elevation thereof, on line 4—4, Fig. 2.

Fig. 5 is a central sectional elevation thereof, on line 5—5, Fig. 3.

In the particular embodiment of this invention illustrated by way of example in the drawings, 7 represents a base of any suitable type on which the indicator mounting may be supported. This base is only partly shown and may be of any suitable or desired construction for securing my improved test indicator mounting on any suitable support. The base may, for example, be mounted on the bed of a lathe or other machine or on a table on which the work pieces are placed for testing and inspection of the same.

On this base is mounted a column comprising a plurality of members, that shown by way of example including a lower member 8 which is suitably secured to the base 7, an intermediate member 9, and an end member 10 on which a test indicator 11 having a suitable feeler 12 may be mounted. While I have shown a column comprising three members, it will be obvious that for certain purposes, a column comprising only two pivotally connected members shown may be sufficient for the purpose for which the device is to be used. This might, for example, be accomplished by omitting the member 8 and mounting the lower end of member 9 on the base. If desired, more than three members may constitute the column.

The lower member 8 of the column may be rigidly secured to the base 7 in any suitable or desired manner, and in the particular construction shown by way of example, the base is provided with an aperture into which an end 14 of the member 8 may fit. The member 8 is of hollow or tubular form and the lower part of the base may be provided with screw threads engaged by a bolt or screw 15, which, when tightened, draws the lower member 8 securely into engagement with the base. The lower member may, for example, have a shoulder 16 bearing against the upper face of the base and the shoulder is drawn tightly into engagement with the base by a screw 15. By loosening the screw 15, the lower member may be turned about its axis for the purpose of supporting the indicator 11 in different relations to the base.

The intermediate member of the column 9 is mounted to swing relatively to the lower member 8 about a pivot pin 18. For this purpose, the upper end of the lower member 8 may be provided with a central slot 19 into which a portion 20 of the intermediate member 9 extends for the purpose of forming a pivotal connection by means of which the two members 8 and 9 are held against movement in any direction except about the axis of the pivot.

This pivotal connection 18 is for the purpose of enabling the indicator to be swung out of its operative position, and means are provided whereby the indicator may be returned accurately to its operative position. For this purpose, I provide cooperating parts or stop means on the members 8 and 9 of the column, by means of which these two members may be accurately held in predetermined relation to each other in such a manner that when the member 9 is swung approximately into its initial position, it will be accurately drawn in such position. Any suitable or desired means may be provided for this purpose, and in the construction illustrated by way of example, I have provided in the member 8 a plunger or detent member 22, the upper end of which is formed to seat in a notch or recess 24 in the extension 20 of the intermediate member 9. The plunger 22 may be slidably mounted in an axial hole formed in the lower member 8 and this plunger may be pressed into engagement with the extension 20 of the member 9 in any suitable manner, for example, by means of a spring 25 also seated in the axial bore or hole of the member 8. A screw 26 having a threaded engagement in the bore of the lower member 8 may be adjusted to vary the tension of the spring 25.

By means of the construction described, it will be obvious that by grasping the column members 9 and 10 and urging the same to swing about the pivot 18, the plunger or detent member will be forced by a cam action out of the recess 24, whereupon the column members 9 and 10 and the test indicator mounted thereon may be swung from their operative position shown in full lines in the drawings, to an inoperative position, such for example as shown in broken lines in Fig. 2, or to any intermediate position between the full line and broken line positions shown in Fig. 2. When the test indicator is in the inoperative position shown in broken lines in Fig. 2, it will ordinarily be positioned out of the way of any work part, thus enabling the work part which has been tested to be replaced by another work part to be tested. When another work part has been placed in the desired position, the members 9 and 10 of the column may be restored to their full line positions, by swinging them approximately into such position, whereupon the plunger 22 seating in the recess 24 of the column 9 forces this member by a cam action into its correct operative position and holds this member accurately in the same position relatively to the column member 8 which it had formerly occupied.

A movable connection is also provided between the column members 9 and 10 to enable the upper member 10 to be swung into different relations to the intermediate member 9. This pivotal connection should be arranged with its axis extending into a different angular relation to the axis of the pivot 18, since it may be necessary to swing the indicator about both axes in order to move it into an inoperative position to clear the work piece, or to clear machine parts adjacent to the indicator. In the construction illustrated by way of example, the column members 9 and 10 are pivoted to swing about an axis which is substantially coaxial with an axis extending in the general direction of the length of the column.

For this purpose, the upper portion of the intermediate member 9 is provided with a longitudinal bore in the upper end thereof and the upper member 10 has a reduced lower cylindrical part 30 formed to fit into the bore of the member 9. The part 30, and if desired, a portion of the member 10, is preferably also hollow and a coil spring 31 may be arranged within this hollow part with one end thereof connected to the column member 9 and the other end to the column member 10 for the purpose of yieldingly urging these members toward each other. The column members 9 and 10 are also provided with stop means or parts formed to facilitate the return of these column members to their initial positions after they have been swung about their pivotal connection. In the construction shown for this purpose, the column member 9 is provided in the upper end thereof with one or more notches 33 into which one or more projections 34 of the column member 10 may enter. In the use of this connection between the members 9 and 10, if it is desired to swing the test indicator out of its operative position, the column member 10 is raised against the action of the spring 31 and turned about its upright pivotal connection with the column member 9 to swing the indicator 11 in either direction into an inoperative position. For example, the test indicator may be swung into either of the two broken line positions shown in Fig. 1, or into other positions about the axis of the pivotal connection between the members 9 and 10. By means of this arrangement, the test indicator 11 may be swung out of the way of some obstruction which would interfere with the swinging of the same only about the pivot 18. When it is desired to return the test indicator 11 to its operative position, the upper column member 10 is again turned so that the projections 34 thereof will enter into the recesses 33 of the intermediate column member 9. The projections 34 of the upper column member 10 will be drawn securely into engagement with the notches 33 in the intermediate column member 9 by means of the tension spring 31, thus restoring the indicator 11 to the position into which it was originally set.

The test indicator 11 may be mounted on the upper column member 10 in any suitable or desired manner to permit the same to be accurately placed into the desired relation to the work while the parts of the column are in their operative relations to each other and to the base. This indicator in the particular construction shown is mounted on the end of an arm 36 by means of a pivotal connection 37 of any suitable or usual type and the arm 36 may be adjustable in the direction of its length relatively to the upper column member 10 in any suitable or usual manner. For example, the upper column member may be provided with a transverse aperture in which the arm 36 is slidably mounted. The upper end of the column member 10 may be provided with a slot into which the eye of an eye bolt 39 enters. A nut 40 serves to draw the eye bolt upwardly and thus lock the arm 36 in adjusted position.

The dial test indicator mounting described has the advantage that when the work pieces to be tested are of such a nature that they cannot be placed into and out of position to be tested without requiring removal of the test indicator, the indicator can readily be moved out of its operative position without removing the base or the column member 8 out of the position in which they were originally set. Either the member 10 or the member 9 may be swung on its pivot to move the test indicator out of its operative position and where necessary, both of these column members may be swung about their pivotal connections to enable the test indicator to be placed in any inoperative position where it is out of the way and when the test indicator is again needed, it can be moved into its operative or correctly adjusted position without requiring any adjustment or setting of the same.

It will be understood that various changes in the details, materials and arrangements of parts which have been herein described and illustrated, may be made by those skilled in the art within the principle and scope of the invention as expressed in the appended claims.

I claim as my invention:

1. A test indicator mounting comprising a plurality of members, one of said members being constructed to be secured in a fixed position, another member having a test indicator secured thereto and an intermediate member pivotally connected to said other two members, adjusting means on said other member for enabling said test indicator to be secured in correct relation to the work to be tested, pivotal connections between said adjacent members, the axes of said pivotal connections between said intermediate member and said other two members being arranged in angular relation to each other, cooperating parts associated with said pivotal connections for releasably holding each of said members in fixed relation to the other members, said cooperating parts when released permitting said members to swing about the axes of their pivotal connections, said members when returned to their initial positions being again held by said parts in the positions formerly occupied thereby.

2. A test indicator mounting including a plurality of members pivotally connected with each other, one of said members being constructed to be secured in a fixed position with reference to work pieces to be tested, another member having said test indicator secured thereto, adjusting means on said other member for enabling said test indicator to be secured in correct relation to the work to be tested, and a third member arranged intermediate of said other members, pivotal connections between adjacent ends of said members, said pivotal connections having their axes extending in different angular relations to each other, means associated with each of said pivotal connections for releasably holding adjacent members in predetermined relation to each other, said means when released permitting said members to turn about their pivotal connections to move said test indicator into inoperative positions and to swing back into positions in which said means again become effective for releasably holding said members in the same relations to each other which they occupied before turning of the same about said pivotal connections.

3. A test indicator including a column comprising at least three members, the first of said members being constructed to be secured in a fixed position, the second of said members having a test indicator secured thereto, adjusting means on said other member for enabling said test indicator to be secured in correct relation to the work to be tested, and a third member intermediate between said first and second members, said intermediate member having a pivotal connection with both said first and second members, the pivotal connection between the first and third of said members including a substantially horizontal pivot pin connecting adjacent parts of said members, means cooperating with said pivotal connection for releasably holding said first and intermediate members in a predetermined relation to each other and releasable to permit said intermediate member to turn out of said predetermined position about the axis of said pivotal connection, a vertical pivotal connection between said intermediate member and said second member, a spring for drawing said intermediate and second members toward each other, and stop means on said intermediate and second members including a notch in one of said members and a projection on the other member formed to enter said notch for yieldingly holding said intermediate and second members in predetermined position relatively to each other.

4. A test indicator mounting including a column comprising a plurality of members pivotally connected to each other, one of said members being constructed to be secured in a fixed position and another member having said test indicator secured thereto and an intermediate member pivotally connected to said other two members, adjusting means on said other member for enabling said test indicator to be secured in correct relation to the work to be tested, the axes of said pivotal connections between said intermediate member and said other two members extending in different angular relations to each other, the pivotally connected ends of said column members each including a notch and a projection arranged to enter said notch to hold said members in predetermined relations to each other, and yielding means for urging said projections into said notches to releasably hold said column members in their predetermined relations to each other, whereby said column members may be swung about their pivots to move said test indicator out of its operative position, and when swung back, said members will be positioned and held in their operative positions by said yielding means to position said test indicator in its operative position.

RICHARD J. MAUS.

REFERENCES CITED

The following references are of record in the file of this patent:

UNITED STATES PATENTS

| Number | Name | Date |
|---|---|---|
| 122,370 | Doolittle | Jan. 2, 1872 |
| 416,755 | Schoenke | Dec. 10, 1889 |
| 611,190 | Abernathy | Sept. 20, 1898 |
| 840,241 | Nootbaar | Jan. 1, 1907 |
| 1,617,747 | Douglas | Feb. 15, 1927 |
| 2,219,370 | Pierce | Oct. 29, 1940 |
| 2,351,531 | McLean | June 13, 1944 |